June 14, 1960

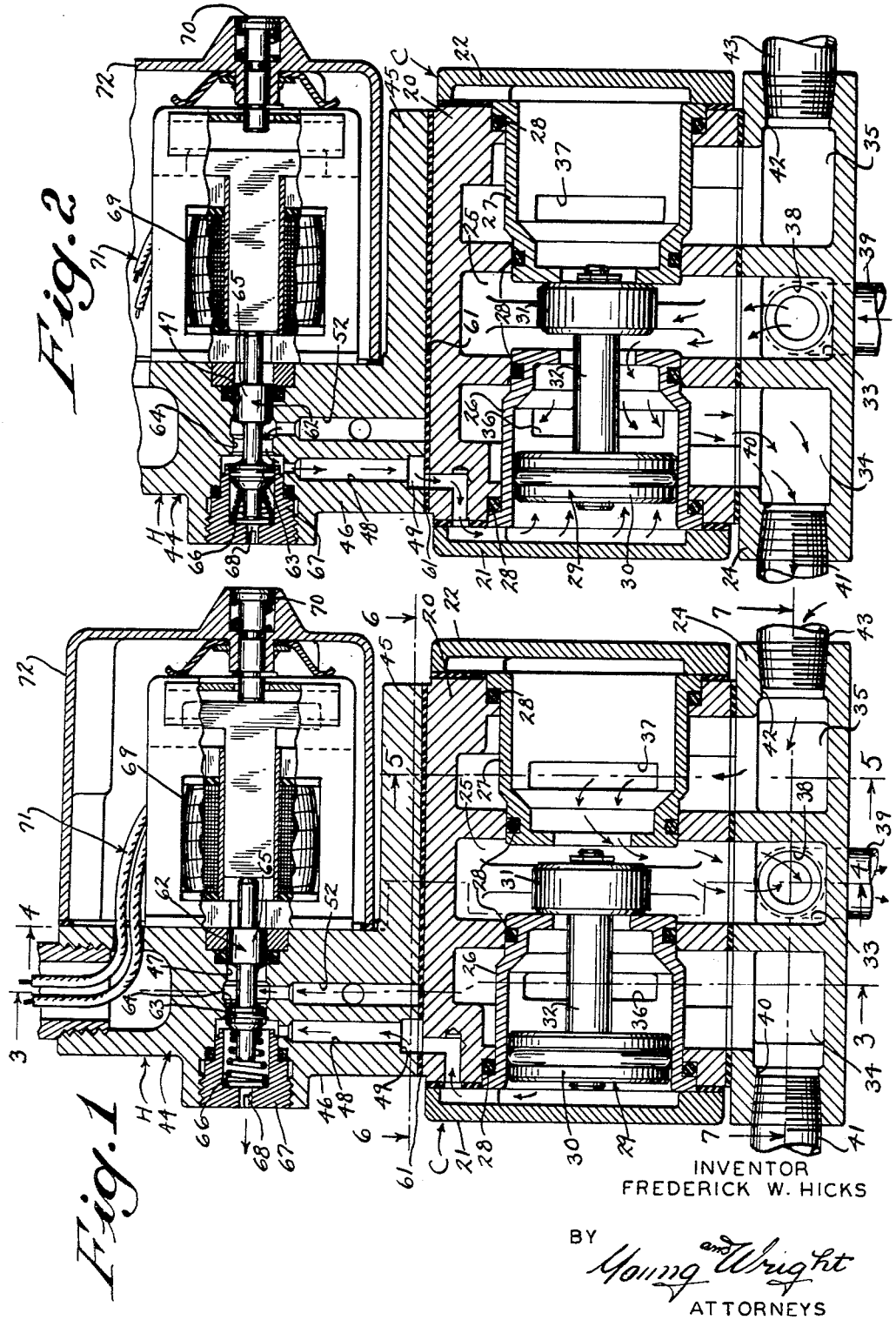

F. W. HICKS 2,940,475

VALVE

Filed Sept. 30, 1957

INVENTOR
FREDERICK W. HICKS

BY

Young and Wright

ATTORNEYS

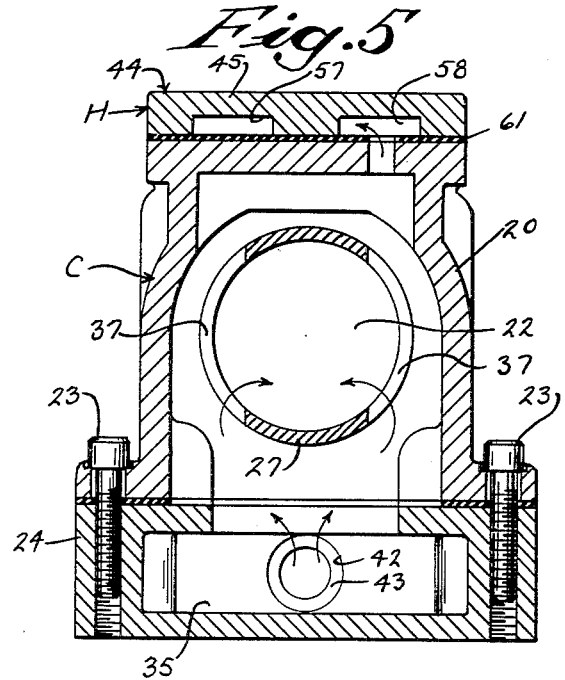
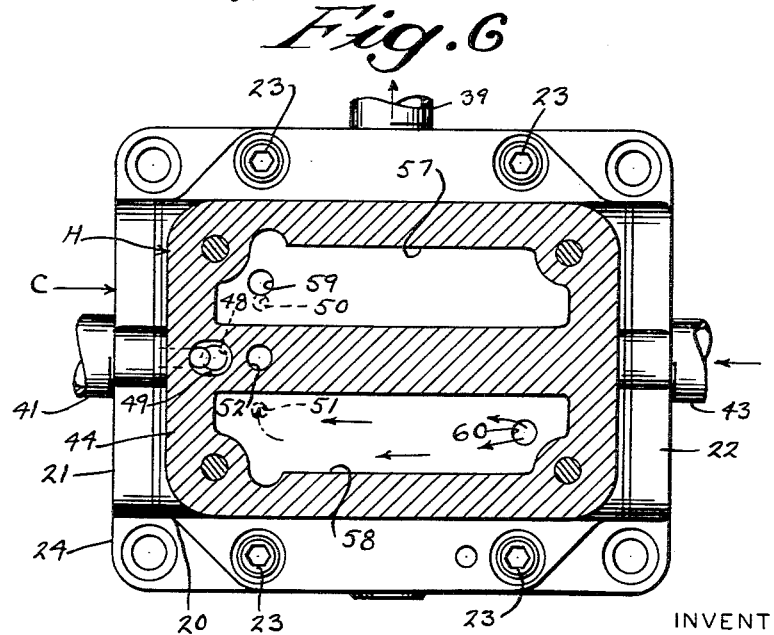

June 14, 1960  F. W. HICKS  2,940,475
VALVE
Filed Sept. 30, 1957  7 Sheets-Sheet 4

INVENTOR
FREDERICK W. HICKS

BY
Young and Wright
ATTORNEYS

June 14, 1960 F. W. HICKS 2,940,475
VALVE
Filed Sept. 30, 1957 7 Sheets-Sheet 5
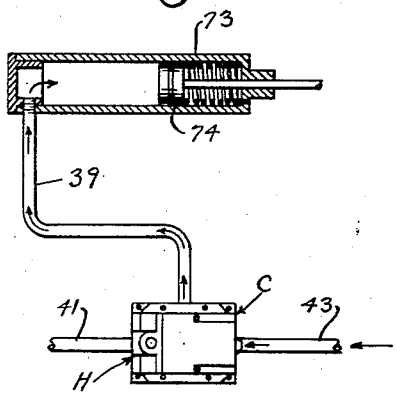
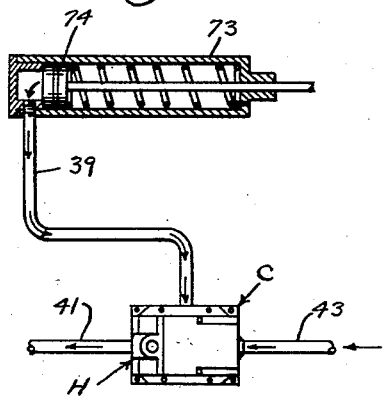
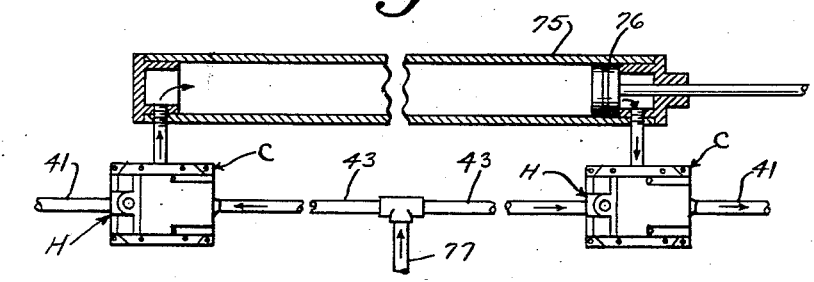
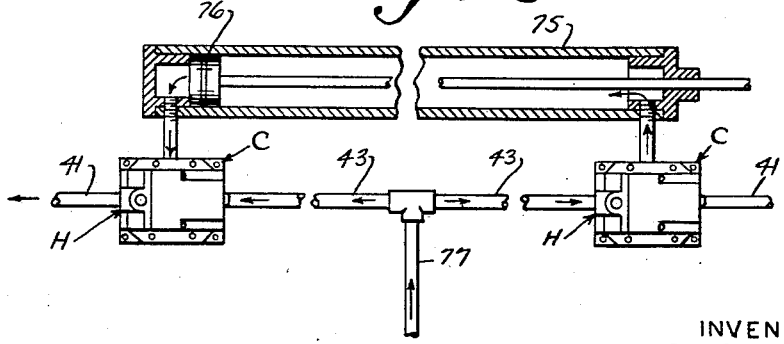
INVENTOR
FREDERICK W. HICKS
BY
*Young and Wright*
ATTORNEYS

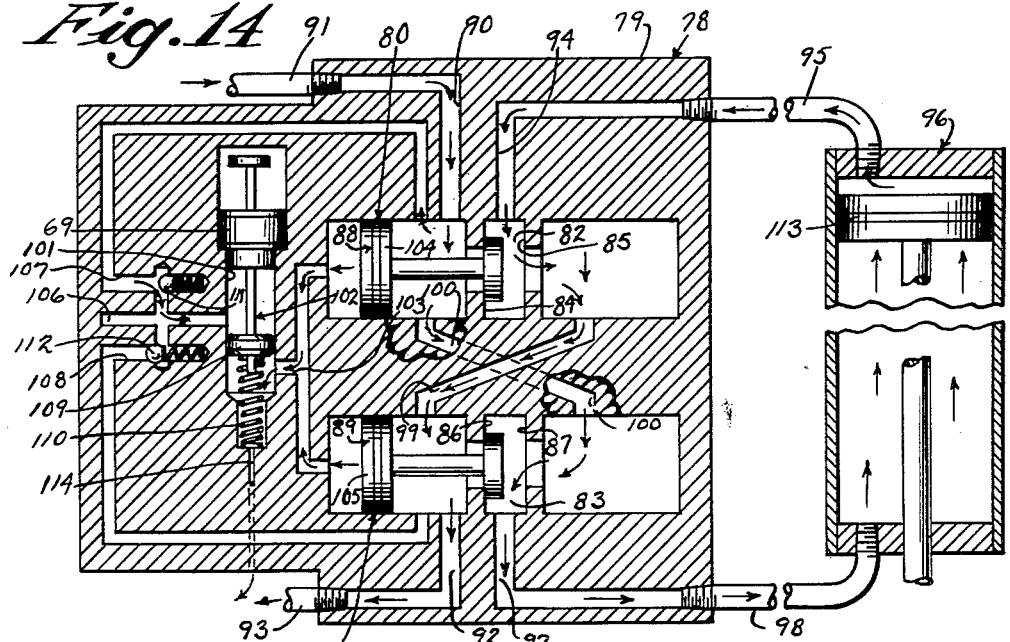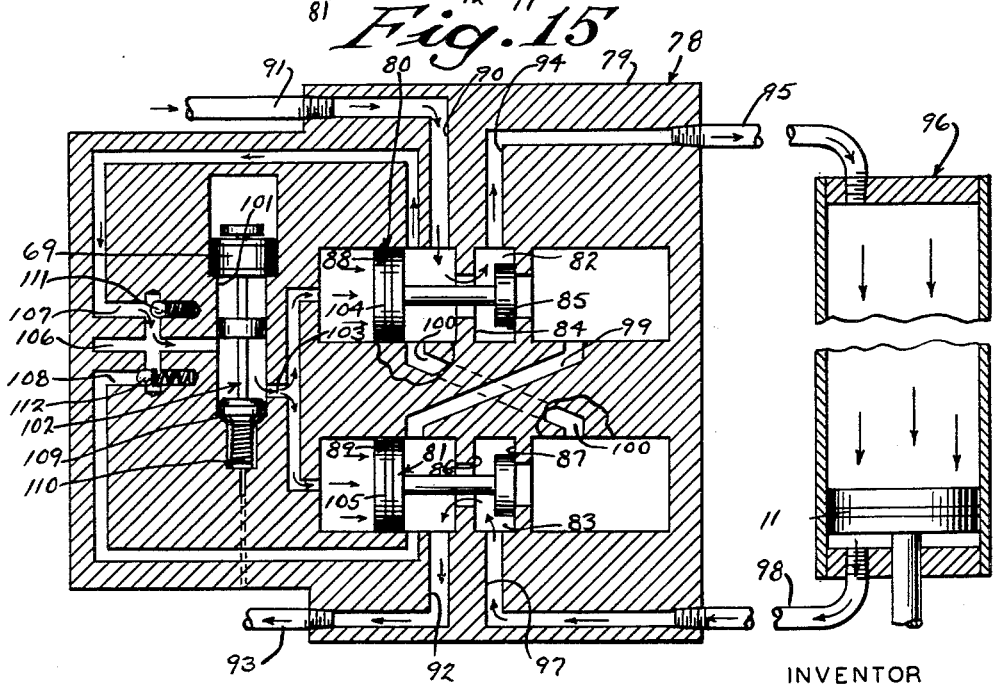

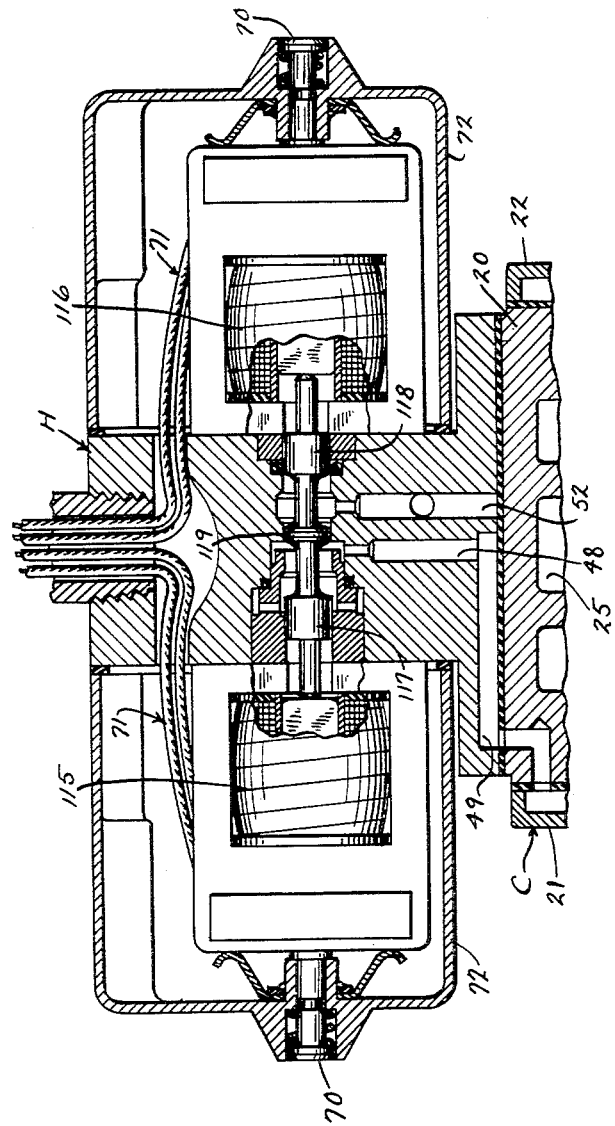

United States Patent Office 2,940,475
Patented June 14, 1960

2,940,475
VALVE

Frederick W. Hicks, Milwaukee, Wis., assignor to Galland-Henning Manufacturing Company, Milwaukee, Wis., a corporation Filed Sept. 30, 1957, Ser. No. 686,918

6 Claims. (Cl. 137—623)

This invention appertains broadly to valves for controlling fluid operated mechanisms, such as reciprocating pistons and the like, and more particularly to a pressure operated selector pilot head for actuating such control valves.

One of the primary objects of my invention is to provide an improved selector valve mechanism for cooperation with a piston operated poppet valve initiated for controlling the flow and exhaust of fluid from an operating mechanism, the selector valve mechanism being automatic in operation and functioning in connection with a balanced solenoid operated valve for directing the fluid under pressure to the piston end of the poppet valve for actuating the same.

Another salient object of my invention is the provision of spring pressed selector valves carried by a pilot head and disposed between the control valve and the balanced solenoid operated valve for permitting the correct flow of fluid under pressure from the control valve to the piston end of the control valve upon energizing of the balanced solenoid valve, the arrangement of the spring pressed selector valves being such that pilot pressure is maintained at the piston end of the control valve as long as the solenoid remains energized.

A further important object of my invention is the provision of novelly arranged automatically operated selector check valves in the passageway of a pilot head for a control valve, whereby not only the correct and proper flow of fluid is directed to the piston end of a poppet control valve, but whereby such pressure is automatically maintained at the desired and correct times.

A still further object of my invention is to provide a novel organization of poppet control valves and pilot heads, so that the two can be easily associated together and whereby interchangeability of pilot heads and poppet control valves is assured.

With these and other objects in view, the invention consists in the novel construction, arrangement and formation of parts, as will be hereinafter more specifically described and claimed, and illustrated in the accompanying drawings, in which drawings, Figure 1 is a central longitudinal sectional view, through a poppet control valve and its pilot head, the view showing the poppet valve in one of its two positions for permitting the flow of fluid under pressure to an operating cylinder;

Figure 2 is a view similar to Figure 1, but showing the poppet valve in the other of its two positions with the solenoid valve energized and the flow of fluid from the pilot head to the piston end of the poppet valve for permitting the exhaust of fluid from an operating cylinder;

Figure 5 is a transverse sectional view taken on the line 5—5 of Figure 1, looking in the direction of the arrows;

Figure 6 is a horizontal sectional view taken on the line 6—6 of Figure 1, looking in the direction of the arrows, the view illustrating certain of the cavities and passageways for the flow of fluid under pressure to and from the pilot head;

Figure 10 is a diagrammatic view showing the use of the device with a spring return operating piston, the view showing the flow of fluid under pressure to the cylinder against the tension of the spring, the view corresponding to Figures 1 and 8, when the control valve and selector head are utilized with a spring return piston;

Figure 11 is a view similar to Figure 10, but showing the exhaust of the fluid from the cylinder, the view corresponding to Figures 2 and 9 when the control valve and pilot are utilized with a spring return piston;

Figure 12 is a diagrammatic view illustrating the use of a normally open and a normally closed control valve at the opposite ends of a double acting pressure operated piston;

Figure 13 is a view similar to Figure 12, but showing fluid being exhausted from the opposite end of the cylinder from Figure 12 and fluid under pressure entering the other end of the cylinder;

Figure 4:
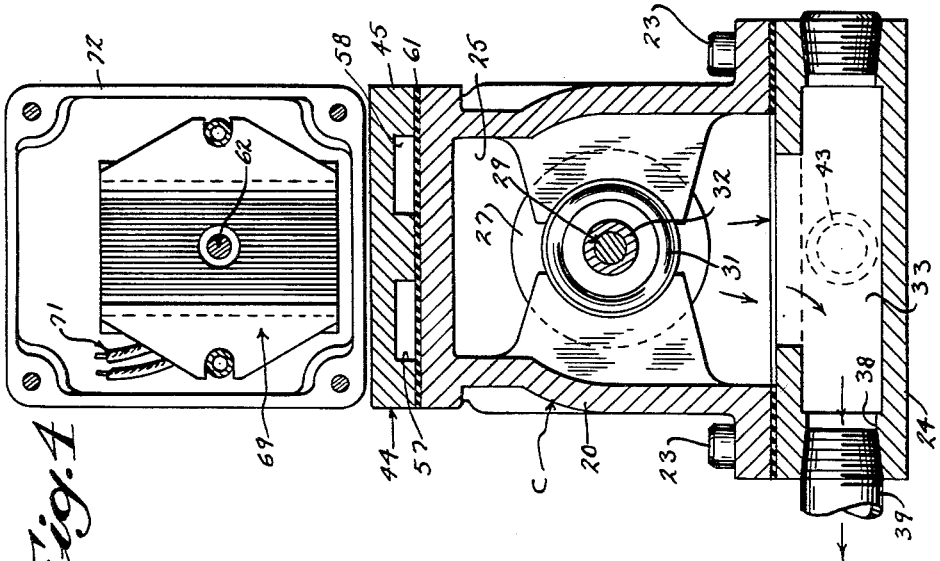
Figure 4 is a transverse sectional view through the control valve and selector head, but taken on the line 4—4 of Figure 1, looking in the direction of the arrows.

All of the above views show the use of a single solenoid operated balanced valve with a three-way control valve.

Figure 14 is a schematic sectional view showing a double control valve for use centrally of a double acting operating piston, the view showing diagrammatically the arrangement of the cavities, ports and passageways for such valve, the view also showing the entrance of fluid under pressure to one end of the cylinder and the exhausting of fluid from the other end of the cylinder;

Figure 15 is a view similar to Figure 14 but showing the position of parts with the flow and exhaust of fluid from the opposite ends of the cylinder, as shown in Fig. 14;

Figures 14 and 15 are illustrative of a four-way valve.

Figure 16 is a longitudinal sectional view through my improved pilot head showing the balanced valve operated to its open and closed position by solenoids arranged at each end of the valve stem.

Referring to the drawings in detail, wherein similar reference characters designate corresponding parts throughout the several views, the letter C generally indicates a control valve of the three-way type and H the novel pilot head therefor.

The control valve C comprises a hollow casing 20 open at its opposite ends, and said ends are closed and sealed by removable heads 21 and 22. The casing is firmly secured by bolts 23 to a base 24. The casing 20 includes a central chamber 25 and extending into the casing are valve seats 26 and 27. The valve seats are sealed within the casing and their inner ends extend into the central chamber 25. The valve seats 26 and 27 are insertable in the casing 20 through the open ends thereof and again, the ends of the casing are closed by the heads 21 and 22. O-rings 28 are provided for insuring a fluid tight connection between the valve seats and adjacent walls of the casing. A poppet valve assembly 29 is provided and this assembly includes a piston 30 reciprocally mounted in the valve seat 26, a double ended poppet valve 31 and a spacer rod 32. The poppet valve 31 is disposed within the central chamber 25 and is movable from one seat 26 to the other seat 27 and vice versa, for opening and closing said seats.

The base 24 includes a central cavity 33 and end cavities 34 and 35. The central cavity 33 communicates at all times with the central chamber 25. The cavity 34 communicates with the casing at one side of the central chamber and the cavity 35 communicates with the casing on the opposite side of the central chamber 25. Inward of its valve seat face, the valve seat 26 is provided with ports 36 which communicate with the interior of the casing 20 and the cavity 34. The valve seat 27 is provided with ports 37 which communicate with the interior of the casing 20 and the cavity 35. The central cavity is provided with a port 38 having a conduit or pipe 39 leading therefrom and this conduit or pipe can be considered as leading to an operating cylinder, as will be later set forth. The cavity 34 is provided with a port 40 and leading from this port is a conduit or pipe 41 which, at the moment, can be considered as an exhaust pipe for an operating cylinder. The cavity 35 is provided with a port 42 having communicating therewith a pipe or conduit 43 which can be considered as a pressure conduit line. The control valve shown can be considered as of the normally open type, i.e., the flow of pressure through the valve into the cylinder, and when the valve is of the normally closed type, i.e., pressure normally cut off, but open for exhaust, the position of the exhaust and pressure conduits 41 and 43 is reversed.

From the description so far, it can be seen that when the poppet valve body 31 is in the position shown in Figure 1, flow of fluid under pressure is permitted through the valve seat 27 to the central chamber 25, through the cavity 33 and out port 38 to the cylinder. When pressure is applied to the piston end 30 of the poppet valve assembly the poppet valve will be moved on the seat 27 as shown in Figure 2, and flow of fluid under pressure to the cylinder is stopped and exhaust of fluid from the cylinder is permitted through pipe 39, port 38, central cavity 33, chamber 25 through valve seat 26, ports 36, cavity 34 and out pipe 41.

The casing 20 is provided with certain other passageways for communication with certain passageways in the pilot head H, as will be later described.

The pilot head H includes a block 44 of a size and shape which can be conveniently and detachably fitted on the upper face of the control valve C. The block 44 is of an L shape and hence includes a substantially flat shaped foot 45 and an upstanding arm 46. The arm 46 is provided with a horizontally extending stepped bore 47 which opens out through the opposite sides thereof. Communicating with the bore adjacent to but spaced from its inner end is a vertically extending way 48. This way communicates with an angle shaped passageway 49 which opens into the casing 20 at the piston end 30 of the poppet valve assembly 29. The block 44 is also provided in its arm portion with a pair of laterally spaced passageways 50 and 51. These passageways communicate with a vertically extending centrally disposed common passageway 52 which opens up into the bore 47 inward of the passageway 48. The passageway 50 below the common passageway 52 is provided with a valve seat 53 and fitted on this seat 53 is a spring pressed check valve 54. The passageway 51 below the common passageway 52 is likewise provided with a seat 55 and a spring pressed check valve 56 is provided for this seat. The passageways 50 and 51 communicate respectively with longitu- dinally extending cavities 57 and 58 formed in the lower face of the foot part 45 of the block 44. The valve casing 20 of the control valve C at the valve seat end 26 is provided with a port 59 which communicates with the cavity 57. The casing 20 at the valve seat side 27 is provided with a port 60 which communicates with the cavity 58. A gasket 61 is provided between the block 44 and the top of the casing 20 and is only provided with with the necessary opening for establishing communication between the pilot head the the valve C, as will later appear.

Now referring back to the stepped bore 47, the same has slidably mounted therein a balanced pilot valve 62 having its valve body portion 63 slidably fitted on an annular shoulder 64 formed on the bore and this valve body portion 63 in one position normally prevents communication between the common passageway 52 and the passageway 48 leading to the piston end 30 of the poppet valve assembly (see Fig. 1). When the balanced pilot valve 62 is in the position shown in Figure 2, then communication is established between the common way 52 and the way 48. It is to be also noted, that the stem of the pilot valve is provided with a cylindrical head 65 which slidably engages the wall of the bore and this head and the valve body portion 63 are of equal diameter and the head 65 is disposed at all times laterally and inward of the common passageway 52. Hence, any pressure in way 52 acting on the valve body portion 63 and the head 65 will balance the pilot valve. The pilot valve is normally held in the position shown in Fig. 1 to block communication between passageways 52 and 48 by an expansion spring 66. This expansion spring 66 engages against a spring retainer 67 which is threaded into the bore, and it is to be noted that this spring retainer is provided with a by-pass port 68, the purpose of which will later appear. It is to be noted, however, that when the pilot valve is in the position shown in Fig. 1, flow of fluid from the piston end 30 of the control valve is permitted through the by-pass port 68. The inner end of the stem of the valve extends outward of the bore and is operated by a solenoid 69, when the solenoid is energized. It might be noted, at this point, that a button 70 is provided for manually operating the solenoid when such need arises. The electric wiring 71 for the solenoid leads out of the block 44 and suitable electric controls, not shown, are provided for opening and closing a circuit through the windings of the solenoid. The solenoid is housed by a suitable cover 72.

From the description so far it can be seen, with the poppet valve in its position shown in Figure 1, that flow of fluid under pressure is permitted through the control valve, through port 42, valve seat 27, cavity 33 through port 38 to an operating cylinder. Upon the energizing of the solenoid 69, the pilot valve 62 will be shifted to the left (see Figure 2), and the air under pressure from the valve casing flowing through cavity 58 and passageway 51, will unseat the check valve 56 and hold the check valve 54 on its seat. The fluid flowing through passageway 52 will enter passageway 48 and passageway 49 to the piston end 30 of the poppet valve assembly and the poppet valve will be shifted to the left (Figure 2) causing the valve to move off of its seat 26 and against the seat 27. This will shut off the flow of fluid from pipe 43 to the central chamber 25 and air can be exhausted from an operating cylinder to the central passageway 25 through valve seat 26 to cavity 34 and out pipe 41. Flow of air under pressure against the piston of the poppet valve assembly 29 reduces pressure on top of the check valve 56. When the fluid under pressure again reaches balance on the opposite side of the check valve 56, the check valve again reseats itself by means of its spring and maintains the pilot pressure behind the piston of the poppet valve, as long as the solenoid remains energized. This traps the air within the cavity 58 and the lower end of the passageway 51.

This is important, as it prevents fluttering or motoring of the poppet valve assembly.

When the solenoid 69 is de-energized, the spring 66 will return the pilot valve to the position shown in Fig. 1, in view of the fact that pressure on the pilot valve is balanced. Pressure on the poppet valve body 31 will return the poppet valve assembly to the position shown in Fig. 1, and air can escape behind the piston through passageways 49 and 48, bore 47 and vent port 68.

Figure 8:
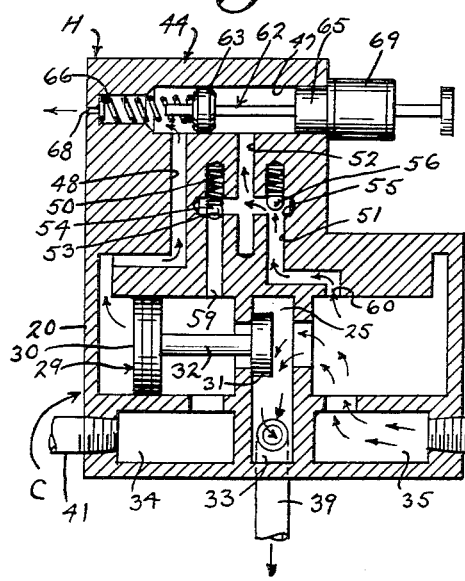
Figure 8 is a schematic longitudinal sectional view illustrating the layout of the cavities, ports and passageways in the control valve and pilot head, the position of the various parts corresponding to Figure 1, of the drawings.
Figure 9:
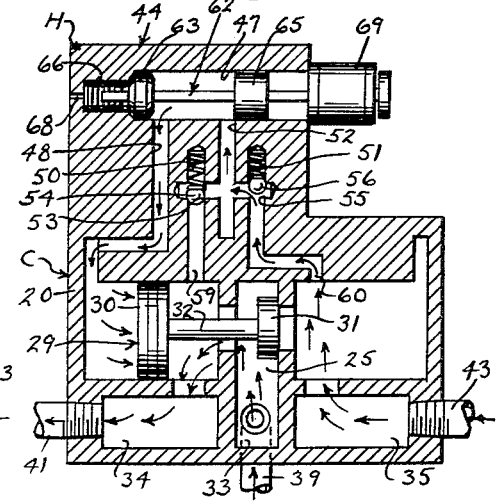
Figure 9 is a view similar to Figure 8, but showing the position of operating parts corresponding to Figure 2.

The operation, just described, takes place when the control valve is of the normally open type and when the control valve is of the normally closed type, i.e., pressure normally cut off and with the position of the exhaust and pressure conduits 41 and 43 reversed; then the operation is as follows: The poppet valve assembly 29 will then normally be in the position shown in Figure 8 and pressure enters through conduit 41, cavity 34 through cylinder chamber, cavity 57 and port 59. This pressure unseats the check valve 54 and the pressure then flows through central passageway 52. At this time, the pilot valve is in its closed position as shown in Figure 8. Upon operation of the pilot valve 62 by its solenoid the same is moved to its position shown in Figure 9 and pressure then flows into the vertical way 48 into the piston chamber forcing the piston over with its valve to the position shown in Fig. 9. At this time, the pressure will hold check valve 56 on its seat. Flow of air under pressure against the piston of the poppet valve assembly 29 reduces pressure on top of the check valve 54. When the fluid under pressure again reaches balance on the opposite sides of the check valve 54, the check valve again reseats itself by means of its spring and maintains the pilot pressure behind the piston of the poppet valve as long as the solenoid remains energized.

Figure 3:
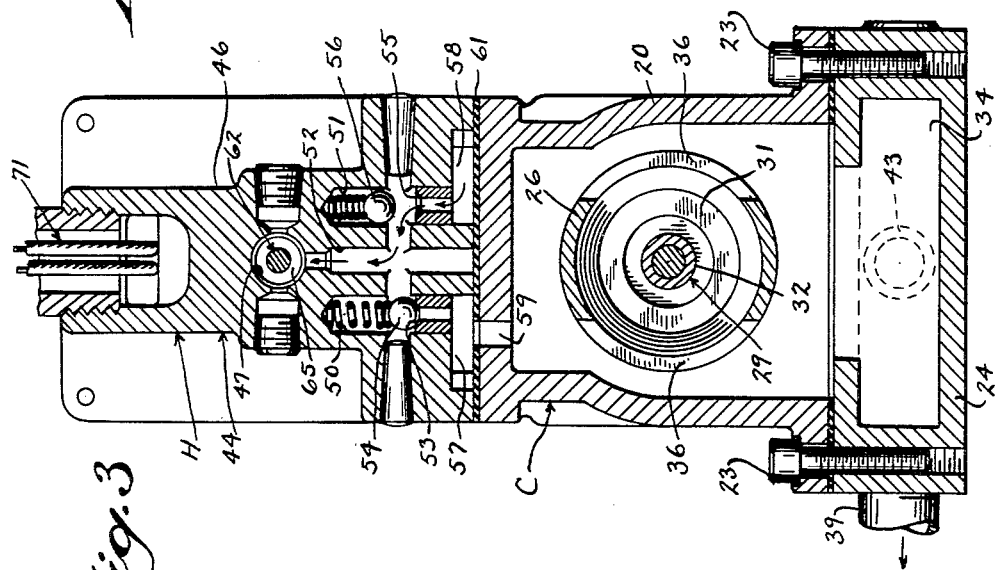
Figure 3 is a transverse sectional view through the control valve and pilot head taken on the line 3—3 of Figure 1, looking in the direction of the arrows, the view showing one of the automatic selector valves unseated by pressure and the other selector valve on its seat.
Figure 7:
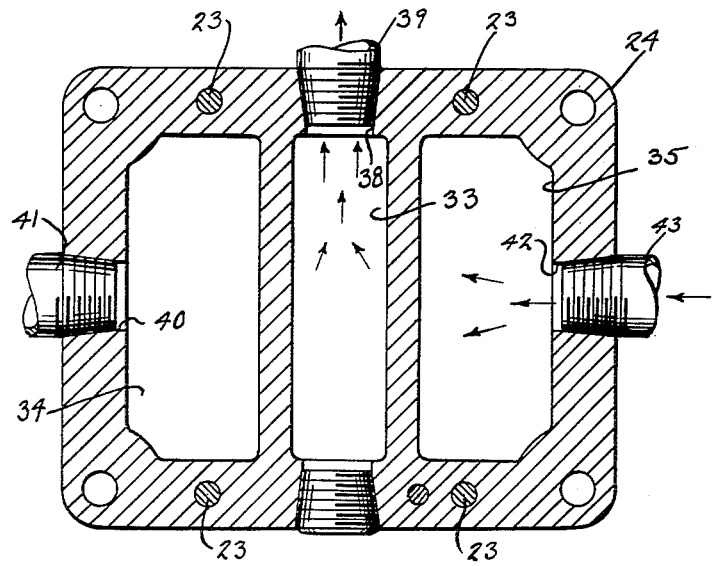
Figure 7 is a horizontal sectional view taken on the line 7—7 of Figure 1, looking in the direction of the arrows, the view showing the cavities in the bottom of the control valve for the flow and exhaust of fluid to and from an operating cylinder.

The control valve with its pilot head has many uses and in Figures 10, 11, 12 and 13, I have shown two uses thereof. Figures 10 and 11 illustrate the use of one control valve with an operating cylinder 73 having a spring returned piston 74. Thus, pipe 39 leads to one end of the cylinder. With an open valve, as shown in Fig. 1, the air flows through the control valve into the cylinder and operates the piston 74 against its spring. When the solenoid 69 is energized, flow of fluid under pressure to pipe 39 is cut off and this pipe then communicates with the exhaust pipe 41 and the spring returns the piston to the left (see Figure 3), and the fluid is exhausted from the left hand end of the piston through the control to the atmosphere or other desired point.

In Figures 12 and 13, I have shown a double acting cylinder 75 and its piston 76 is moved back and forth in the cylinder by pressure operating on the opposite sides of the piston. With the double acting piston, I utilize a control valve and its pilot head H at each end of the cylinder, and this eliminates extensive piping where the operating cylinder is of a considerable length. In this arrangement one control valve C can be considered as normally open (the left hand side), and the other control valve C (on the right hand side), can be considered normally closed. The pipes 43 from the control valves lead to a common supply pipe 77 and with the control valve C at the left normally open, pressure flows through the control valve to the left hand end of the cylinder forcing the piston 76 to the right. As the valve C on the right hand side of the piston is normally closed (to pressure), fluid is exhausted through this valve and out pipe 41. With the positions of the poppet valves reversed in the control valve C (see Figure 13), pressure enters from the control at the right to the right hand end of the cylinder, forcing the piston 76 to the left and fluid is exhausted from this end of the cylinder through the control valve C at the left hand side.

In certain installations it may be desirable to employ a four-way control valve and this valve is diagrammatically shown in Figures 14 and 15, and is indicated by the reference character 78. In effect, the four-way valve 78 consists of two control valves C shown in Figures 1 to 13, inclusive, formed in a single unit. Thus, the four-way valve 78 includes a casing 79 with control valves 80 and 81 therein. The control valve 80 and control valve 81 are each provided respectively with a central chamber 82 and 83. Control valve 80 on each side of the central chamber is provided with valve seats 84 and 85. Control valve 81 on opposite sides of its central chamber is provided with valve seats 86 and 87. A poppet valve assembly 88 is provided for control valve 80 and a poppet valve assembly 89 is provided for control valve 81.

Communicating with control valve 80 on the left hand side of valve seat 84 is a passageway 90, which has communicating therewith a supply pipe 91 for fluid under pressure. Communicating with control valve 81 on the left hand side of its seat 86 is an exhaust passageway 92 and this passageway has communicating therewith an exhaust pipe 93. Communicating with the central passageway 82 of control valve 80 is a passageway 94 and this passageway can be connected by a pipe 95 to one end of a double acting cylinder 96. The central chamber 83 of the control valve 81 has communicating therewith a passageway 97 which connects with the opposite end of the cylinder 96 by a pipe 98. In this unit set up, the control valves 80 and 81 are connected by diagonally extending ports or passageways 99 and 100. The passageway 99 establishes communication between the control valve 80 on the right hand side of its seat 85 with the control valve 81 on the left hand side of its seat 86. The passageway 100 establishes communication between the control valve 80 on the left hand side of its seat 84 with control valve 81 on the right hand side of its seat 87.

The pilot head part for this unit includes a bore 101 having slidably mounted therein a balanced solenoid operated pilot valve 102. The bore has communicating therewith a passageway 103 which in turn communicates with the control valves 80 and 81 at the piston ends 104 and 105 of the poppet valve assemblies 88 and 89, of the control valves 80 and 81. Also communicating with the bore 101 is a passageway 106 which is common to certain passageways 107 and 108. Passageway 107 communicates with control valve 80 on the left hand side of its seat 84 and on the right hand side of the piston ends 104 of the poppet valve assembly 88. Passageway 108 communicates with control valve 81 at the left hand side of its seat 86 and on the right hand side of the piston end 105 of the poppet valve assembly 89. The pilot valve 102 is provided with a valve body portion 109. It is to be noted that the valve body portion 109 is disposed between passageways 103 and 106 when the operating solenoid (indicated by the reference character 69) is de-energized and this pilot head is held in this position by an expansion spring 110. Communication between passageways 107 and 108 with the common passageway 106 is controlled by spring pressed automatically operated check valves 111 and 112.

Now referring back to Figure 14 and considering that the piston 113 of the cylinder 96 is to be moved upwardly it can be seen that fluid under pressure flows through passageway 90, through control valve 80 through passageway 100 to control valve 81, through the control valve and passageway 97 to the bottom of the cylinder. Fluid is exhausted from the top of the cylinder through pipe 95, passageway 94, central chamber 82 of the control valve 80, through passageway 99, through valve 81 and passageway 92 to exhaust pipe 93.

Now referring back to Figure 15 and with the solenoid of the pilot valve energized, the valve body portion 109 of the pilot valve will move past passageway 103 and fluid under pressure will flow through passageway 107 past the check valve 111 (moving the same off of its seat), to common passageway 106, to passageway 103 and to the piston ends of the poppet valve assemblies 88 and 89.

The poppet valves will then move to their respective seats 85 and 87 and flow will be as follows: fluid under pressure will flow through passageway 90, through control valve 80 and the central chamber 82 thereof, through passageway 94 to the upper end of the cylinder 96 forcing the piston 113 to lower. Flow of fluid under pressure through passageway 100 to the central chamber 83 of control valve 81, will be prevented due to the fact that the poppet valve is on its seat 87. The exhaust from the cylinder 96 will be through pipe 98, passageway 97 into central chamber 83 of the control valve 81, through the control valve to passageway 92, and out of exhaust pipe 93. The bore 101 for the pilot valve 102 is vented to the atmosphere as indicated by the reference character 114 so that when the poppet valve assemblies 88 and 89 move to the left, fluid can escape from behind the piston ends of the assemblies to the atmosphere.

While I have shown piston operated poppet valves in the various figures of the drawings, it is to be understood that the improved pilot head can be utilized with other types of control valves employing, for instance, spool valves, diaphragm operated valves, etc.

Great stress is laid on the use and arrangement of the automatic check valves, in that the same govern the proper flow of air, and that these check valves automatically trap the air so that fluttering of the poppet valve assembly is prevented.

Obviously, if so desired, the balanced pilot valves in all instances can be operated in each direction by solenoids, and in fact, in Figure 16 I have illustrated this. Hence, in this figure I have shown solenoids 115 and 116 on the opposite sides of the pilot head and these solenoids engage the opposite ends of the stem of the pilot valve. It is to be also noted that the valve is perfectly balanced as to pressure and thus heads 117 and 118 are arranged on each side of the valve body portion 119. In all other respects, the valve functions in the same manner as the valves previously described.

Various changes in details may be made without departing from the spirit or the scope of my invention, but what I claim as new is:

1. A pilot head for use in conjunction with a control valve for fluid operated pistons and the like mounted for reciprocatory movement in a cylinder, of the type including a casing having an inlet supply port for fluid under pressure, an exhaust port and a cylinder port, and a fluid operated valve in said casing for connecting the inlet supply port and the cylinder port and for closing the exhaust port in one of its two positions, and for closing the inlet supply port and connecting the cylinder port and the exhaust port in the other of its two positions, and said pilot head having a passageway communicating with the casing and the inlet port at all times and a second passageway communicating with the casing on the operating side of the fluid operated valve, said inlet and exhaust ports being interchangeable in use depending upon whether the control valve is of the normally open or of the normally closed type, said pilot head having a pair of passageways for communicating with the casing, one of said passageways being adapted for communication with the casing on one side of the valve end of the fluid operated valve and the other passageway being adapted to communicate with the casing on the other side of the valve end of the fluid operated valve, said pilot head also having a passageway communicating with the casing on the operating side of the fluid operated valve and with said pair of passageways, and a normally closed solenoid operated valve for connecting said pair of passageways with the last named passageway upon the energizing of the solenoid operated valve, and an independent automatic selector check valve in each of the passageways of said pair of passageways, one of said selector check valves being movable off of its seat and the other of said selector check valves being held on its seat when said solenoid operated valve is energized and said selector check valve being returnable to its seat upon equalizing of pressure thereon for trapping air in said passageways and for maintaining pressure on the operating side of said fluid operated valve during the energizing of the solenoid operated valve.

2. A pilot head as defined in claim 1, and means for venting pressure on the operating side of the fluid operated valve when the solenoid operated valve is deenergized.

3. A pilot head for use in conjunction with a control valve for fluid operated double acting pistons mounted for reciprocatory movement in a cylinder of the type including a casing having an inlet port, an exhaust port and ports for communication with the opposite ends of the cylinder, and a pair of independent piston operated valves in said casing, the casing having diagonally extending passageways for establishing communication between certain chambers of the piston operated valves, said casing also having a pair of passageways communicating with the piston sides of the piston operated valves, and said casing also having a pair of passageways communicating with certain chambers of the piston operated valves on the opposite sides of the pistons from the first mentioned pair of passageways, a normally closed solenoid operated valve for establishing communication between the two pairs of passageways upon the energizing thereof, and said pilot head having an independent check valve sensitive to pressure in each one of said second pair of passageways, one of said check valves being adapted to open when the solenoid valve is energized for establishing communication between its passageway and the first pair of passageways and said check valve being seatable upon the balancing of pressure thereon for trapping air in the last mentioned passageway during the energizing of the solenoid operated valve.

4. A pilot head as defined in claim 3, and means for venting said first pair of passageways upon the de-energizing of the solenoid operated valve.

5. A control valve for fluid operated pistons and the like mounted for reciprocatory movement in a cylinder comprising a hollow casing open at its opposite ends and having a central chamber, longitudinally aligned companion valve seats insertable into the casing through its open ends and having their inner ends extending into the central chamber in spaced relation to one another, removable heads closing the open ends of the casing and sealing the valve seats in place, a base secured to the casing below the chamber and having an inlet supply port for fluid under pressure, an exhaust port and a cylinder port, the cylinder port having communication with the central chamber, one valve seat having an opening communicating with the exhaust port and the other valve seat having an opening communicating with the inlet port, a piston operated valve operable in the central chamber and movable from one valve seat to the other for opening and closing the valve seats, the valve in one position establishing communication between the inlet port and the cylinder port and in its other position establishing communication with the cylinder port and exhaust port, the piston for said valve being slidable in one of said valve seats, and a pilot head carried by the upper end of the casing above the valve seats, said pilot head having a passageway communicating with the casing and the inlet port at all times and a passageway communicating with the casing and the interior of one valve seat on the operating side of the piston for the valve, and a normally closed solenoid operated pilot valve in said pilot head for connecting said passageways upon the energizing of the solenoid of the solenoid operated pilot valve, said valve seats being removable from the casing through the open ends of the casing without disturbing the pilot head or base and passageways and ports therein.

6. A control valve for fluid operated pistons and the like mounted for reciprocatory movement in a cylinder as defined in claim 5, and said piston operated valve and said solenoid operated valve being disposed in parallel relation.

References Cited in the file of this patent

UNITED STATES PATENTS

| | | |
|---|---|---|
| 1,952,690 | Strom | Mar. 27, 1934 |
| 2,337,573 | Schultz | Dec. 28, 1943 |
| 2,382,322 | Lornitzo | Aug. 14, 1945 |
| 2,390,425 | Crum | Dec. 4, 1945 |
| 2,617,444 | Gardner | Nov. 11, 1952 |
| 2,650,609 | Harbst | Sept. 1, 1953 |
| 2,690,767 | Sage | Oct. 5, 1954 |
| 2,700,986 | Gunn | Feb. 1, 1955 |

FOREIGN PATENTS

| | | |
|---|---|---|
| 462,487 | France | Nov. 24, 1913 |